United States Patent
Szita et al.

(10) Patent No.: US 6,631,046 B2
(45) Date of Patent: Oct. 7, 2003

(54) SERVO TRACK WRITING USING EXTENDED COPYING WITH HEAD OFFSET

(75) Inventors: Gabor Szita, Santa Clara, CA (US); Karl A. Belser, San Jose, CA (US); ChiapHeok Ang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 235 days.

(21) Appl. No.: 09/756,952

(22) Filed: Jan. 9, 2001

(65) Prior Publication Data

US 2001/0040752 A1 Nov. 15, 2001

Related U.S. Application Data (60) Provisional application No. 60/175,322, filed on Jan. 10, 2000.

(51) Int. Cl.⁷ .......................... G11B 21/02; G11B 5/596; G11B 5/09
(52) U.S. Cl. ................... 360/75; 360/77.07; 360/77.08; 360/51
(58) Field of Search .......................... 360/75, 51, 78.04, 360/76, 77.03, 77.08, 78.14, 77.07

(56) References Cited

U.S. PATENT DOCUMENTS

| | | | |
|---|---|---|---|
| 4,414,589 A | 11/1983 | Oliver et al. | |
| 4,933,795 A | 6/1990 | Nigan | |
| 5,229,901 A | * 7/1993 | Mallary | 360/244 |
| 5,404,255 A | 4/1995 | Kobayashi et al. | |
| 5,457,586 A | 10/1995 | Solhjell | |
| 5,473,550 A | 12/1995 | Cameron et al. | |
| 5,541,784 A | 7/1996 | Cribbs et al. | |
| 5,570,332 A | 10/1996 | Heath et al. | |
| 5,640,755 A | 6/1997 | Kubota et al. | |
| 5,659,436 A | 8/1997 | Yarmchuk et al. | |
| 5,682,274 A | * 10/1997 | Brown et al. | 360/77.04 |
| 5,760,990 A | 6/1998 | Ukani et al. | |
| 5,774,294 A | 6/1998 | Fioravanti | |
| 5,777,816 A | 7/1998 | Hampshire et al. | |
| 5,793,555 A | 8/1998 | Belser et al. | |
| 5,835,300 A | 11/1998 | Murphy et al. | |
| 5,844,675 A | 12/1998 | Hayes et al. | |
| 5,867,353 A | 2/1999 | Valent | |
| 5,940,240 A | 8/1999 | Kupferman | |
| 5,946,158 A | 8/1999 | Nazarian et al. | |
| 5,982,173 A | 11/1999 | Hagen | |
| 6,014,283 A | * 1/2000 | Codilian et al. | 360/77.08 |
| 6,031,684 A | 2/2000 | Gregg | |
| 6,067,204 A | 5/2000 | Tremaine | |
| 6,078,458 A | 6/2000 | Fioravanti et al. | |
| 6,091,567 A | 7/2000 | Cooper et al. | |
| 6,101,058 A | 8/2000 | Morris | |

FOREIGN PATENT DOCUMENTS

WO  WO 98/31015  7/1998

OTHER PUBLICATIONS

IBM Corporation, "Regenerative Clock Technique For Servo Track Writers," IBM Technical Disc. Bulletin, vol. 33 (No. 5), p. 310, 311, (Oct. 3, 1990).

* cited by examiner

*Primary Examiner*—Andrew L. Sniezek
(74) *Attorney, Agent, or Firm*—Merchant & Gould P.C.

(57) ABSTRACT

The present invention proposes a new servo track writing technique called Extended Copying with Head Offset ("ECHO"). The read and write elements of the read/write head are offset from each other. A servo writer writes a guide pattern on the magnetic media disc. ZAP correction factors are added to the guide pattern. The head disc assembly is then connected to an electrical control system for self-propagating servo writing. The actuator arm is displaced until the read head is aligned over the guide pattern. A new servo track is written by the write element. ZAP correction factors are added to the newly written servo track. The actuator arm is displaced until the read element is aligned with the newly written servo track. A new servo track is written. ZAP correction factors are added to the newly written servo track. The process is repeated until a desired number of servo tracks are written.

11 Claims, 7 Drawing Sheets

SERVO TRACK WRITING USING EXTENDED COPYING WITH HEAD OFFSET

RELATED APPLICATIONS

This application claims priority of U.S. provisional application Ser. No. 60/175,322, filed Jan. 10, 2000.

FIELD OF THE INVENTION

This application relates generally to disc drive data storage devices and more particularly to an apparatus and method of writing servo track information thereon.

BACKGROUND OF THE INVENTION

Disc drives are the most common means of storing electronic information in use today. Ordinary disc drives are typically constructed with the following internal components: one or more magnetic media discs attached to a spindle; a spindle motor that rotates the spindle and the attached discs at a constant high speed; an actuator assembly, located adjacent to the discs, with a plurality of actuator arms that extend over the discs, each with one or more flexures extending from the end of each actuator arm, and with a read/write head mounted at the distal end of each flexure; and a servo positioner that rotates the actuator assembly about a bearing shaft assembly positioned adjacent to the discs such that the read/write heads radially traverse the disc surface (i.e., move back and forth the between the inner and outer diameters of the disc).

Information is stored on and retrieved from a magnetizable material on the disc's surface. To facilitate information storage and retrieval, discs are radially divided in concentric circles known as "servo tracks" or "tracks". The tracks are given a track number so that the servo positioner can locate a specific track. The servo positioner, upon receiving a control command, aligns the read/write head over the desired track. Information can be stored or retrieved from the disc once the read/write head is in the correct position. The process of switching between different tracks is called "seeking", whereas remaining over a single track while information is stored or retrieved is called "following".

Each track is subdivided into pie-shaped sections, called "segments" or "sectors". The two most common types of sectors are informational data sectors and servo data sectors. In a typical disc drive, the informational data sectors usually contain information generated or stored by the user such as programs files, application files, or database files. There may be ten to a hundred, or even more, informational data sectors dispersed around a single track.

The servo data sectors, on the other hand, contain information that is used by the servo positioner to determine the radial position of the head relative to the disc surface and relative to the track center. Servo sectors typically consist of a Grey code field, which provides coarse position information such as the track and cylinder number, and a servo burst field, which provides fine position information such as tie relative position of the head to the track center. Generally speaking, the burst field creates a signal with a specific voltage magnitude when the read head is not aligned over the track centerline. The signal is decoded to pinpoint the read head's location and the read head is moved directly over the centerline by positioning the read head such that the sum of the burst field voltages equal zero.

Servo sectors are usually placed between adjacent informational data sectors on the same track. A clock signal mechanism is used to insure that data intended to be stored in a servo sector does not overwrite data in an information sector (and vice versa).

During the servo writing process, a timing pulse from the clock signal mechanism notifies the servo positioner when the head is over a servo sector (as opposed to over an information sector). The write enable signal is turned on and information is written to the servo sector. The timing pulse also notifies the servo positioner when the head is over an information sector. The write enable signal is turned off and servo information is not stored in the informational data sector during the servo writing process.

In contrast during normal disc drive operation, the timing pulse notifies the servo positioner when the head is over an information sector (as opposed to a servo sector). The write enable signal is turned on and data is written to the information sector. The timing pulse also notifies the servo positioner when the head is over a servo sector. The write enable signal is turned off and user data is not stored in the servo sector during normal disc drive operation.

Information is transferred to and from the tracks by the read/write heads attached to the flexures at the end of the actuator arms. Each head includes an air bearing slider that enables the head to fly on a cushion of air in close proximity to the corresponding surface of the associated disc. Most heads have a write element and a read element. The write element is used to store information to the disc, whereas the read element is used to retrieve information from the disc.

The number of tracks located within a specific area of the disc is called the "track density". The greater the number of tracks per area, the greater the track density. The track density may vary as the disc is radially traversed. Disc manufacturers attempt to increase track density in order to place more information on a constant size disc. Track density may be increased by either decreasing the track width or by decreasing the spacing between adjacent tracks.

An increase in track density necessitates increased positioning accuracy of the read/write elements in order to prevent data from being read from or written to the wrong track. Manufacturers attempt to fly the read/write head elements directly over the center of the desired track when the read/write operation occurs to insure that the information is being read from and written to the correct track. Hitting the track center target at high track densities requires that the tracks be as close to perfectly circular as possible when written to the disc surface.

Tracks are usually written on the disc during manufacturing using one of two means: 1) a servowriting machine, or 2) self-propagated servo writing. In both methods, a timing clock is used to notify the servo positioner when the head is over an area where a servo sector is to be written. A write enable signal is activated and servo information is written when the timing pulse indicates that the head is located over a servo sector. The write enable signal is de-activated and information is not written once the head exits the area where a servo sector is to be written.

A servowriting machine is a large piece of external equipment that writes servo tracks on a disc drive. The servowriting machine uses a very accurate lead screw and laser displacement measurement feedback device to precisely align a write element. The write element, which is attached to an external head/arm positioner, is aligned relative to where the desired track is to be written on the disc surface. A track is written on the disc once the write element is correctly aligned. The head/arm positioner then moves the write element a predetermined distance to the next desired track location. The head/arm positioner, therefore, controls both the track placement and track-to-track spacing.

A servowriter, however, has several drawbacks. First, a typical disc may contain more than 60,000 servo tracks. The process of aligning and writing each track on the disc is very time consuming and expensive. Second, although very accurate at lower track densities, the servowriter cannot meet the accuracy requirements dictated by higher track densities. Finally, the procedure must be completed in a clean room because the disc components are exposed during servowriting; again adding expense to the servowriting procedure.

The second means of writing tracks on a disc is called self-propagating servo writing. Oliver et al first described this method of servo track writing in U.S. Pat. No. 4,414,589. Several other patents have disclosed slight variations in the Oliver patent, but the same basic approach is used. Under the basic method, the drive's actuator arm is positioned at one of its travel range limit stops. A first reference track is written with the write head element. The first reference track is then read with the read element as the head is radially displaced from the first reference track. When a distance is reached such that the read element senses a predetermined percentage of the first reference track's amplitude, a second reference track is written. The predetermined percentage is called the "reduction number". For example, the read element senses 100% of the first reference track's amplitude when the read element is directly over the first reference track. If the reduction number is 40%, the head is radially displaced from the first reference track until the read element senses only 40% of the first reference track's amplitude. A second reference pattern is written to the disc once the 40% is sensed by the read element. The head is then displaced in the same direction until the read head senses 40% of the second reference track's amplitude. A third reference track is then written and the process continues. The process ends when the actuator arm's second limit stop is reached and the entire disc surface is filled with reference tracks. The average track density is then calculated using the number of tracks written and the length of travel of the head.

If the average track density is too high, the disc is erased, the reduction number is lowered so that a larger displacement occurs between tracks, and the process is repeated. If the track density is too low, the disc is erased, the reduction number is increased so that a smaller displacement occurs between tracks, and the process is repeated. If the track density is within the desired range, the reduction number for the desired average track density has been determined, the disc is erased, and servo tracks are written to the disc by alternatively writing servo and reference tracks. The servo tracks are further divided by alternatively writing servo and informational sectors.

Several drawbacks exist with the current methods of self-propagating servo writing. First, the disc has to be free of "noise" (i.e., stray signals) before the first servo track can be written on the disc. A disc erase procedure must be completed to rid the disc of noise. The erase process is completed by moving the actuator assembly to one of its travel-range-limit stops, generating a write enable signal in the write element without a corresponding write data signal, and "spiraling" the head over the disc surface until the actuator assembly reaches its second travel stop. This process is "blind" in the sense that the position of the head cannot be accurately determined because all information, even servo information, is erased as the write head spirals over the disc surface. As a result, it is likely that the disc has not been completely erased and some signal noise remains.

Noise reduces the accuracy of the servo writing process by causing the read head to erroneously determine that the reduction number has or has not been met. The read element, for example, may be at a distance from the reference track where, without noise, 40% of the reference track's signal would be sensed. The read element, however, senses a different amplitude, say 50% of the reference track signal's amplitude, because of noise present on the magnetic media. The servo positioner adjusts the actuator arm to compensate for the noise until the read head senses 40%. The read head will then be at an incorrect distance from the reference track and the track that is being written contains a shape defect.

A second drawback of self-propagating servo writing is that it is difficult to obtain perfectly circular tracks. Mechanical problems (such as spindle wobble, disc slip, changing head fly height, and thermal expansion among others) will cause imperfections in the shape of the track being written. For example if the fly height of the read element increases, the signal strength of the previous track will decrease below the desired level and the actuator arm is moved to compensate. This adjustment causes a deformation in the track that is being written. Any imperfections in the previous track will propagate to the track being written because the read element "follows" the path of the previous track in self-propagating servo writing. The imperfections of the previous track may even be amplified within the new track in some circumstances.

Another problem with prior art self-propagating servo writing is caused by the changing virtual read/write element offset. The virtual offset of the read element to the write element, relative to the surface of the disc, changes as the head radially traverses the disc. The virtual offset between the read/write elements approaches or equals zero (i.e., the read and write elements line up) at certain actuator arm positions. The head position signal, derived by monitoring the magnitude of the signal generated in the read head by the previously written track, is difficult to obtain at the points where the virtual offset approaches or equals zero. This approach to measure position is inherently inaccurate due to signal magnitude variations caused by changing fly height and media imperfections. The servo positioner, therefore, cannot accurately place the head relative to the disc surface and errors in the servo writing occur when the virtual offset approaches or equals zero and an accurate position error signal is not available.

Ideally, tracks are perfectly circular and spaced at a specific distance from each other. Imperfections in track shape and spacing are referred to as "track squeeze". Track shape imperfections are referred to as dynamic or AC track squeeze, whereas track spacing imperfections are referred to as static or DC track squeeze. AC track squeeze refers to the situation in which two adjacent tracks have shape imperfections at different locations around their individual circumferences. The two tracks may be too close together at some points and too far apart at other points. DC track squeeze, on the other hand, refers to the situation in which two adjacent tracks are either closer or farther apart than a nominal distance. In other words, the spacing between the two tracks is incorrect even though the two tracks are perfectly circular. The term "track squeeze" is often used to generally refer to the combination of AC and DC track squeeze. Furthermore, the track-to-track variation of track shape is called the "relative track shape error", whereas the deviation of the track shape from a perfect circle is called "absolute track shape error". The prior art methods of machine servo writing and self-propagated servo writing cannot achieve the accuracy needed for higher track densities because of inherent limitations in controlling track squeeze, relative track shape error, and absolute track shape error.

The read/write head elements, as mentioned above, are targeted to fly directly over the center of the desired track when the read/write operation occurs to insure that the information is being read from and written to the correct track. Track shape imperfections make continuous centering of the read/write elements over the track difficult. A method of compensating for imperfections in track shape, called Zero Acceleration Path ("ZAP") correction, has been developed. The basic idea of ZAP correction is to add appropriate correction factors to the measured head position at each servo sector. The correction factors cancel all written in errors, thereby resulting in a nearly perfectly circular modified track. The correction factors are typically determined during or after the servo track writing process. The correction factors are then written back on the disks; usually each servo sector has a dedicated field for storing the correction factors. The prior art methods of self-propagated servo writing, however, do not use ZAP correction to prevent track shape imperfections during the self-propagating servo writing process.

Accordingly there is a need for a method of writing servo tracks on disc drives that overcomes the limitations of both a prior art servowriter and self-propagating servo writing.

SUMMARY OF THE INVENTION

Against this backdrop the present invention has been developed. The present invention proposes a new servo track writing technique called Extended Copying with Head Offset ("ECHO"). In a preferred embodiment of the ECHO technique, the read and write elements of the read/write head are offset from each other by at least one track width. In other words, if the read head is aligned with a first track, the offset is at least large enough that the write head is aligned over the adjacent track. In accordance with a preferred embodiment of the present invention, the read head is closer to the inner diameter and the write head is offset at least one track width towards the outer diameter relative to the disc's surface. However, the method is also applicable when the read head is closer to the outer diameter of the disk. It should also be noted that the ECHO technique may be implemented using any clock-timing signal propagation methods that are described in prior art self-servo track writing approaches.

In a preferred embodiment of the ECHO technique, a disc is placed in a servowriter and a guide pattern is written on the inner diameter of the magnetic media disc. The guide pattern is comprised of servo tracks written on the disc. The guide pattern should contain at least as many tracks as the reader-writer offset. Preferably the guide pattern is comprised of 50 to 100 servo tracks, as compared to the more than 60,000 servo tracks written by a servo writer using prior art methods. An enormous amount of time is saved because only a guide pattern is written with the servowriter. Additionally, the accuracy limitations encountered by the servowriter machine at high track densities is avoided. Furthermore, the amount of "clean room" time required is decreased, thereby reducing the overall cost.

The disc is then mated with a head actuator assembly to form a head disc assembly ("HDA"). The HDA is connected to an electrical control system for self-propagating servo writing. ZAP correction factors are determined and written to the servo sectors of the guide pattern. The self-propagating servo writing begins after the ZAP correction factors are added to the guide pattern.

Self-propagating servo writing begins with the control system completing several calibrations (such as calculating reader/writer offset, writer width, and read width among others). The control system displaces the actuator arm until the read element is located over the position in the guide zone such that the write element, offset from the read element, is aligned over the location to which the next servo track is to be written. Preferably the read element is at least one track closer to the inner diameter of the disc surface because the read and write elements are offset. The write element is then activated and a new servo track is written by the write element. ZAP correction factors are then added to the servo sectors of the newly written servo track.

The control system then displaces the actuator arm until the read element is located at the position over the previously written tracks (i.e., either within the guide zone or over the self-propagated tracks) such that the write element, offset from the read element, is aligned over the location to which the next servo track to be written. The read head is at least one track closer to the inner diameter of the disc surface because of the offset. The write element is then activated and a new servo track is written. Again, ZAP correction factors are added to the servo sectors of the newly written servo track. Again, the control system, using the calculated offset, displaces the actuator arm until the write element is aligned with the next servo track to be written. The process continues until the desired number of servo tracks is written on the disc, the disc is filled with servo tracks, or the actuator assembly travel-limit-stop is reached.

In another preferred embodiment, the read element follows the guide pattern servo tracks, and then, the servo tracks written by the write element during the ECHO process. It is not necessary for the read/write element offset to be a whole number of tracks. In other words, the read element will not necessarily be positioned over a track center during the ECHO servowriting process. A 3-½-track reader/writer offset, for example, will cause the read element to be located over a boundary between two previously written tracks when the write element is located over the center of the track being written.

The ECHO technique typically eliminates the need to completely erase the disc as required by the previous methods of self-propagating servo writing. The read element always follows the write element during servo writing because of the read/write element offset. As a result, the write head erases any noise present on the disc surface as it writes new servo tracks. Furthermore, the write element is not completing a "blind" spiraling erase, as is the case in the prior art, because the read element obtains an accurate position feedback signal for the control electronics.

The present invention also eliminates many of the mechanical errors that affect the accuracy of prior art self-servo writing. As previously stated, the prior art method displaces the read head until the signal strength of the previously written servo track is detected. The accuracy of reading a percentage of the signal strength of the previously written servo track is affected by mechanic problems such as spindle wobble, disc slip, changing head fly height and thermal expansion among others. The present invention eliminates this problem by using the same positioning method that is used during normal disc operation. The more accurate servo positioning keeps the read head better aligned. As a result, the track that is being written is less likely to contain deformations caused by mechanical problems.

Furthermore, the present invention eliminates position control limitations caused by changing virtual offset that adversely affect prior art self propagated servo track writing methods. The virtual offset between heads changes as the head radially traverses the disc surface. At some point, the read and write heads are "virtually aligned" and the accuracy of the position error signal decreases. The present invention eliminates this problem because the offset is large enough such that the read and write elements never "virtually align". Therefore, an accurate position error signal is always available during the servo track writing process. Preferably the change in virtual offset is accounted for by calibrating the control system (such as calculating the virtual reader/writer offset among others) at different locations relative to the disc surface.

A preferred embodiment of the present invention utilizes ZAP correction factors to cancel any written errors that occur during the servo writing process. The ZAP correction factors can be used to correct errors in the guide pattern and to correct errors present in the servo tracks written by the offset write head. The ZAP correction factors are written into both the guide patterns and offset-write-head-written servo tracks before the actuator arm is displaced to align the offset read head. The read head's track following ability is greatly improved by the ZAP correction factors, allowing the track being written by the offset write head to be nearly perfectly circular.

Finally, the present invention reduces AC and DC track squeeze and allows higher track densities to be achieved. The present invention eliminates AC and DC track squeeze by avoiding "virtual alignment" (thereby providing better position error signals during servo writing), by utilizing ZAP correction factors (thereby providing a nearly perfectly circular track for the read element to follow), and by avoiding the "blind" spiral erase process (thereby eliminating any noise that may cause deformation in the written servo track). These and various other features as well as advantages which characterize the present invention will be apparent from a reading of the following detailed description and a review of the associated drawings.

DETAILED DESCRIPTION

Figure 1:
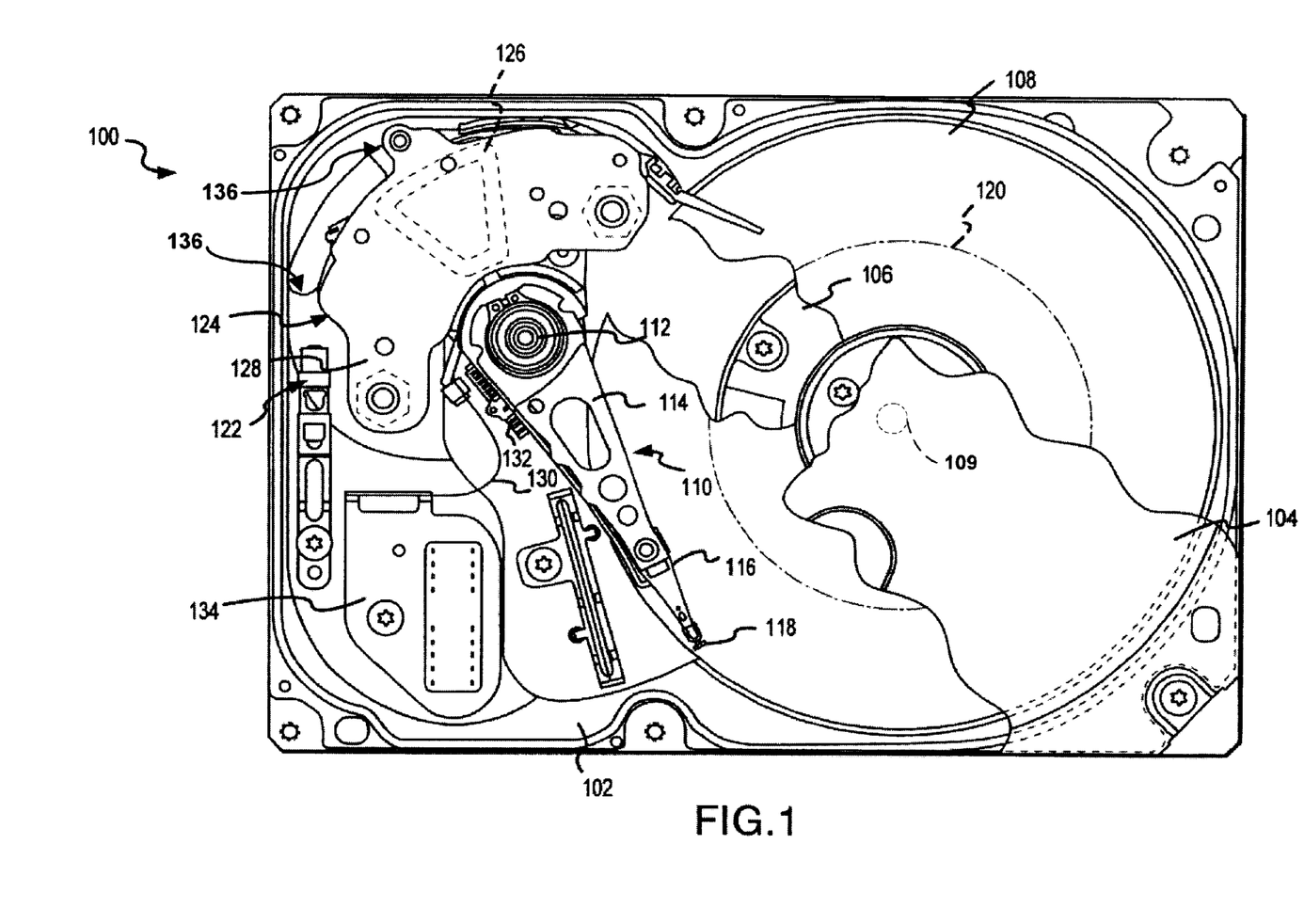
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more magnetic media discs 108 at a constant high speed about a disc center 109. A magnetic media disc 108 is used to illustrate a preferred embodiment of the present invention, but the present invention may be implemented using other types of data storage discs. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118, which includes an air bearing slider enabling the transducer head 118 to fly in close proximity above the corresponding surface of the associated disc 108.

During a seek operation, the track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108. The range of motion of the actuator assembly 110 is limited by travel-limit-stops 136 such that the transducer head 118 remains over the surface of the disc 108.

The spindle motor 106 is typically de-energized when the disc drive 100 is not in use for extended periods of time. The transducer heads 118 are moved over park zones near the inner diameter of the discs 108 when the drive motor is de-energized. The transducer heads 118 are secured over the park zones through the use of an actuator latch arrangement 122, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a preamplifier 132 to which head wires (not shown) are connected; the head wires being routed along the actuator arms 114 and the flexures 116 to the heads 118. The preamplifier 132 amplifies read signals generated by the heads 118 during a read operation. The flex assembly 130 terminates at a flex bracket 134 for communication through the base deck 102 to a disc drive printed circuit board (not shown) mounted to the bottom side of the disc drive 100.

Figure 2:
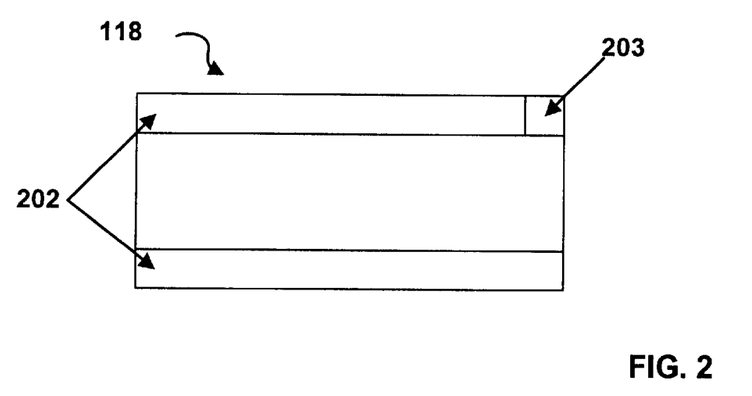
FIG. 2 is a bottom view of a read/write head in accordance with a preferred embodiment of the present invention.

FIG. 2 is a bottom view of head 118 that is used to read and write information to disc 108. The bottom of head 118 has two air bearing sliders 202. The air bearing sliders 202 create a cushion of air that causes head 118 to "fly" relative to the surface of disc 108 when disc 108 is rotated at a high speed. Head 118 also contains a read/write element region 203. Read/write element region 203 contains the transducers used to retrieve information from, and store information to, disc 108.

Figure 3:
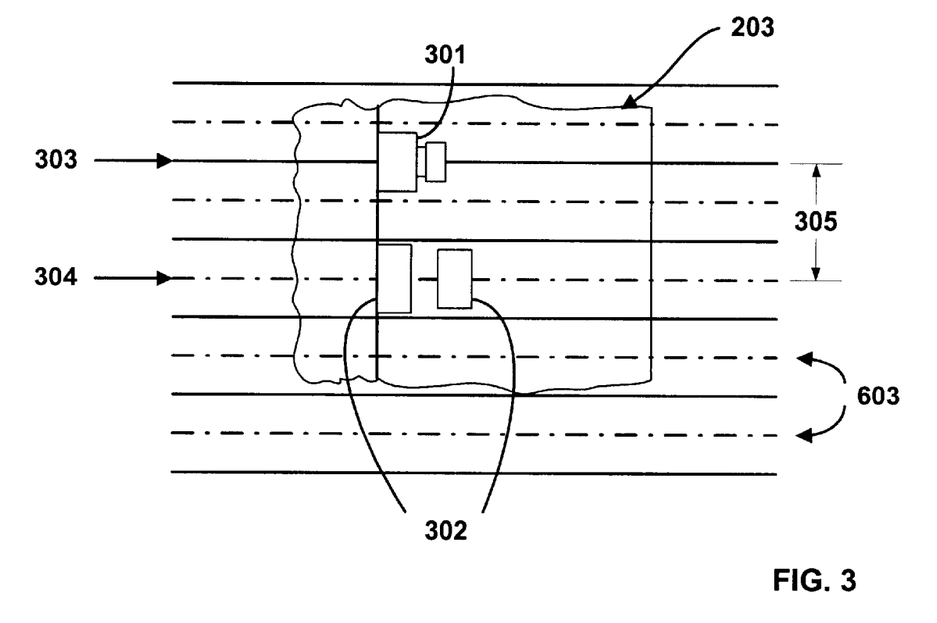
FIG. 3 is a detailed bottom view of the read/write head of FIG. 2.

FIG. 3 is a detailed view of read/write element region 203. In accordance with a preferred embodiment of the present invention, read element 301 is of the magnetoresistive type and write element 302 is of the inductive type. However, the invention pertains to all types and combinations of read/write elements. Inductive write element 302 is basically shaped like a horseshoe, with a gap between the ends of its two "legs". FIG. 3 shows the bottom of the two legs of inductive write element 302. Read element 301 is shown "flying" over a boundary 303 of two adjacent servo tracks 603. In accordance with a preferred embodiment, read element 301 is offset from write element 302 by at least one track 603 width such that write element 302 is shown "flying" over servo track center 304.

In another preferred embodiment, the read/write element offset 305 is calibrated using the following method, although any of several methods of estimating the radial offset 305 between the read element 301 and the write element 302 that will be apparent to one of ordinary skill may be used. First, a track following operation is completed and the position of the read element 301 is designated as $x_1$. Next, a temporary pattern is written with the write head 302 while the read element 301 remains at $x_1$. Then, the read head 301 is displaced towards the temporary pattern until the signal generated in the read head 301, by the temporary pattern is maximal. This position is designated as $x_2$. The reader writer offset 305 is then calculated as $x_1-x_2$. Such a benchmark may easily be used in combination with a trigonometric function of the actuator arm's radial position to update the read/write element radial offset 305.

Figure 4:
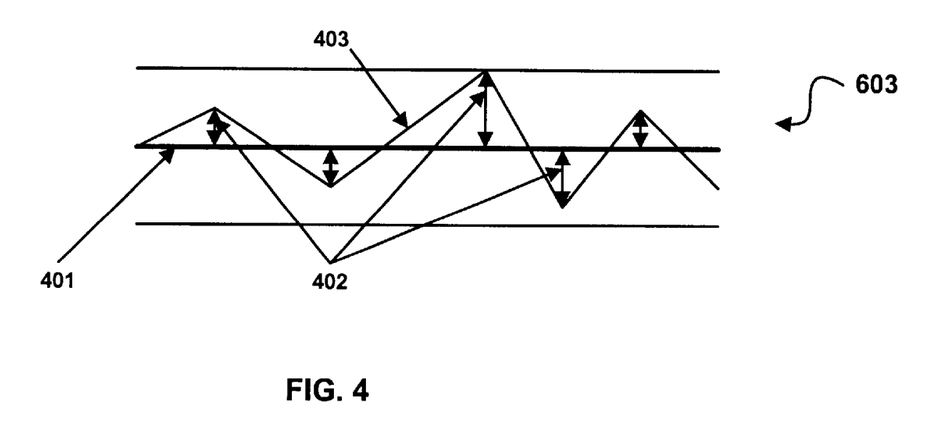
FIG. 4 is an illustration of Zero Acceleration Path correction in accordance with a preferred embodiment of the present invention.

FIG. 4 is an illustration of the zero acceleration path ("ZAP") correction process. A magnified portion of circular servo track 603, as found on disc 108, is shown in FIG. 4. Ideally, servo track 603 is perfectly circular. Due to inaccuracies in the servo track writing process, however, it is difficult to obtain a perfectly circular servo track 603. Original track center 403 represents the servo track's centerline prior to the application of ZAP correction.

As seen in FIG. 4, original track center 403 is not perfectly circular. As a result, any subsequent servo track that is written to the disc using a method of servo track writing that attempts to follow original track center 403 (such as self-propagating servo track writing among others) will contain the same deformation errors as original track center 403. Additionally, the errors in original track center 403 may actually be magnified in some circumstances when writing subsequent servo tracks.

The basic idea behind ZAP correction is to add appropriate correction factors 402 to the measured head position at each servo sector that cancel all written in errors. The shape of the resulting modified track 401 will be nearly perfectly circular after the correction factors 402 are added. Any subsequent servo track that is written to disc 108 using a method of servo track writing that attempts to follow modified track center 401 (such as self-propagating servo track writing among others) will not contain the same deformation errors as original track center 403. Instead, the subsequent servo track will be nearly perfectly circular. Preferably the correction factors 402 are determined during the servo writing process and stored in a dedicated field in each servo sector. The ZAP correction factors 402 can also be used during the normal disc drive 100 operation to cancel any repeatable disturbances, such as track shape irregularity among others.

Figure 5:
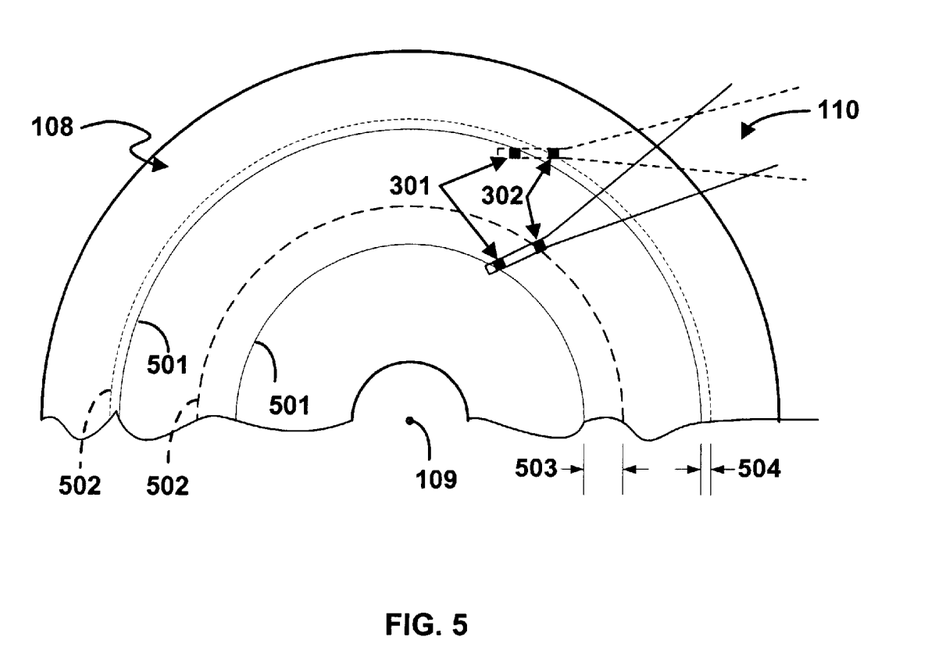
FIG. 5 is an illustration of virtual head offset as an actuator assembly radially traverses a disc drive.

FIG. 5 illustrates the change in virtual head offset as the actuator assembly 110 radially traverses the disc 108 surface. The offset between read element 301 and write element 302 relative to the surface of disc 108 is large when actuator assembly 110 is positioned such that read element 301 and write element 302 are nearer to the inner diameter of disc 108. The large virtual offset is seen by examining distance 503 between reader path 501 and writer path 502. In contrast, the offset between read element 301 and write element 302 relative to the surface of disc 108 is small when actuator assembly 110 is positioned such that read element 301 and write element 302 are nearer to the outer diameter of disc 108. The small virtual offset is seen by examining distance 504 between reader path 501 and writer path 502.

The virtual offset of read element 301 and write element 302 reaches zero in prior art methods of self-propagating servo writing. In other words, read element 301 and write element 302 line up over the same track 120. It is difficult to obtain an accurate position error signal to correctly position the actuator assembly 110 when this occurs. In a preferred embodiment of the present invention, the offset between read element 301 and write element 302 is large enough such that the virtual offset never reaches zero. The present invention permits an accurate position error signal to be available throughout actuator assembly's 110 complete range of travel. In other words, a position error signal is always available as actuator assembly 110 traverses from the inner diameter to the outer diameter of disc 108, thereby allowing actuator assembly 110 to be precisely positioned over the desired track 120.

In a preferred embodiment of the present invention, the virtual offset is calculated at various radial distances as read/write head 118 traverses over disc 108. The virtual offset is calculated in the preferred embodiment using the following method. First, a track 603 following operation is completed and the position of read element 301 is designated as $x_1$. Next, a temporary pattern is written with write head 302 while read element 301 remains at $x_1$. Then, read head 301 is displaced towards the temporary pattern until the signal generated in read head 301, by the temporary pattern is maximal. This position is designated as $x_2$. The virtual offset is then calculated as $x_1-x_2$. The virtual offset value is then used to align the read element 301 such that the write element 302 will be positioned over the desired location for the next servo track. For example, if the virtual offset may change from 5 tracks 603 at the disc 108 ID to 3 tracks at the disc 108 OD. Accordingly, a 5-track offset 305 will be used to position the write element 302 at the ID and a 3-track offset 305 will be used to position the write element 302 at the OD. In a preferred embodiment of the present invention, track density can be controlled by calculating and compensating for the change in virtual offset as the read/write transducer head 118 traverses the surface of disc 108.

Figure 6:
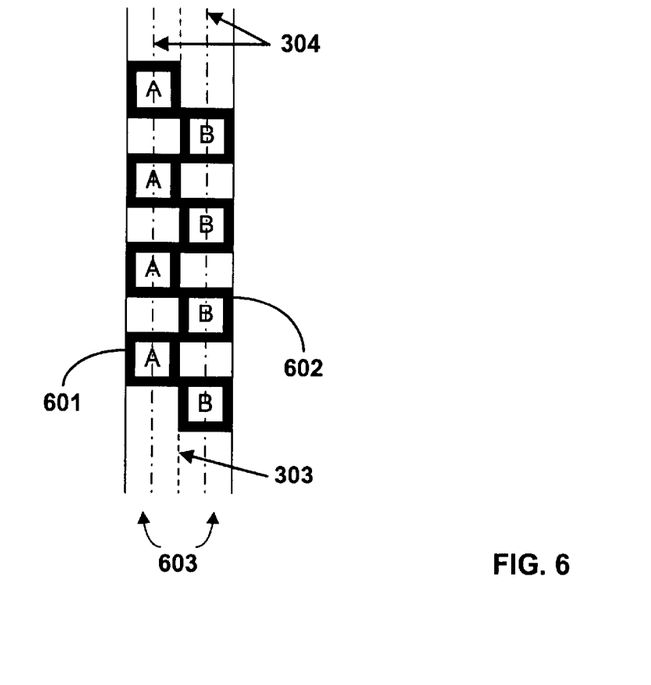
FIG. 6 depicts a servo burst pattern used to align the read/write head with a disc track in accordance with a preferred embodiment of the present invention.

FIG. 6 depicts a common AB split burst servo pattern used to position read element 301. Other servo burst patterns (such as a quadrature pattern and null pattern among others) are common in the art and can be used with the present invention. A servo burst pattern consists of one or more transitions 601, 602 written in a servo track 603 that generate a signal in read element 301. The magnitude of the signal generated in read element 301 by transitions 601, 602 depends on the position of read element 301. The signal magnitude increases as the overlap between the read element 301 and a transition 601, 602 increases. Thus, the servo system can accurately determine the position of read element 301 by monitoring the magnitude of these signals.

The servo system, for example, senses a zero signal magnitude if the portion of the read element 301 that overlaps the A burst pattern 601 equals the portion of the read element 301 that overlaps the B burst pattern 602. The servo system, however, senses a signal magnitude larger than zero if the portion of read element 301 that overlaps the A burst pattern 601 is larger than the portion of the read element 301 that overlaps the B burst pattern 602. Likewise, the servo system senses a signal magnitude larger than zero if the portion of read element 301 that overlaps the B burst pattern 602 is larger than the portion of the read element 301 that overlaps the A burst pattern 601. The servo system uses a decoding scheme to accurately determine the position of read element 301 relative to the transitions 601, 602.

Figure 7:
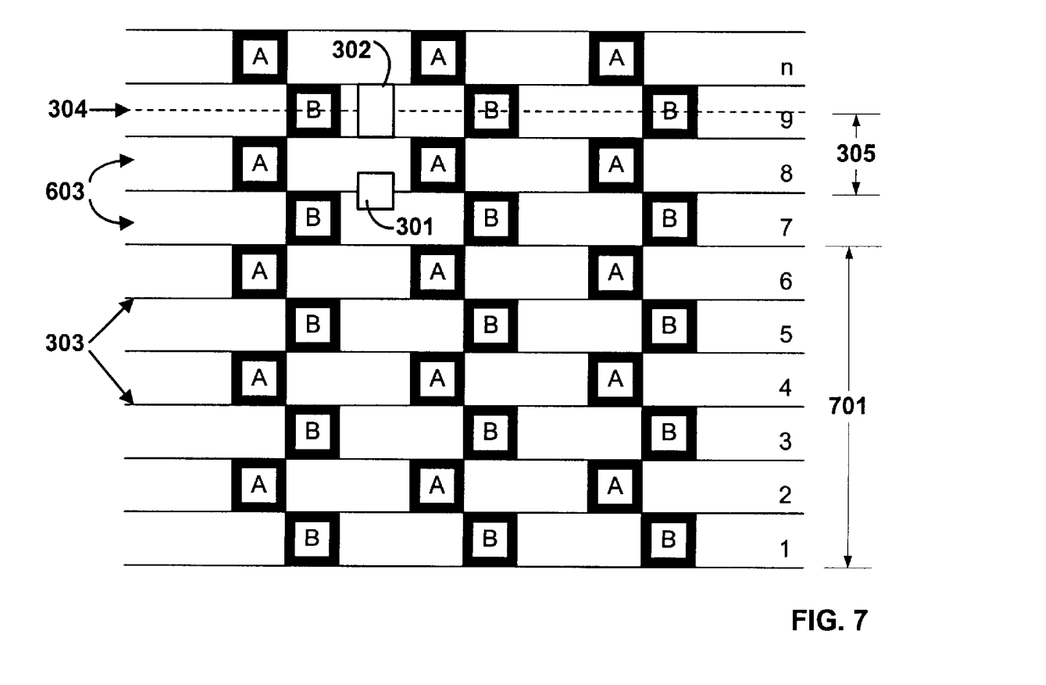
FIG. 7 illustrates the read/write element offset as the head traverses the servo guide pattern in accordance with a preferred embodiment of the present invention.

FIG. 7 illustrates the replication process of a servo track guide pattern 701 in accordance with a preferred embodiment of the present invention. FIG. 7 illustrates, for simplicity, the propagation of an AB servo pattern. The extension of the ECHO servo writing technique to other types of servo patterns (such as quadrature pattern and null pattern among others) is straightforward. A servo writer is used to write a guide pattern 701 on disc 108. Preferably the guide pattern 701 is written at the ID of disc 108, however, the guide pattern or guide patterns 701 can be written at different radially distance along the surface of disc 108. Here, the guide pattern 701 consists of six servo tracks 603. The guide zone consists of more tracks 603 than the offset between read element 301 and write element 302, so that a "gap" in the servo tracks 603 is not created between read element 301 and write element 302. In other words if the reader/writer offset was 5 tracks 603 and the guide zone only consisted of 3 tracks 603, positioning the read element 301 over the first track 603 and writing a track 603 with the write element 302 would create a gap at the track 4 location.

Preferably the offset 305 between the read element 301 and the write element 302 is determined. The read/write element offset 305 is calibrated by following the last track 603 in the guide pattern with the read element 301. The position of the read element 301 is designated as $x_1$ Next, a temporary pattern is written with the write element 302 while the read element 301 remains at $x_1$. Then, the read head 301 is displaced towards the temporary pattern until the signal generated in the read head 301, by the temporary pattern is maximal. This position is designated as $x_2$. The reader writer offset 305 is then calculated as $x_1 - x_2$. The reader/writer element offset 305 shown in FIG. 7 is one-and-a-half tracks.

The disc drive's servo system is activated and the read element 301 is positioned within the guide zone 701 by the servo system such that the write element 302 will be aligned over the next desired track 603 to be written. For example, the guide pattern 701 shown in FIG. 7 consists of tracks 1 thru 6. The next desired track 603 to be written with the write element is track 7. The read element 301 is, therefore, positioned one-and-a-half tracks away from track 7. In other words, to write track 7, the read element is positioned on the boundary 303 between servo track 5 and servo track 6 (this head position is not shown). The servo system positions read element 301 over the center of boundary 303 between servo tracks 5 and 6 such that the signals generated by transitions 602 (in servo track 5) and transitions 601 (in servo track 6) negate each other. Write element 302, due to the one-and-a-half-track offset 305 between the head elements, is aligned (not shown) over the center 304 of servo track 7. Write element 302 is activated and a set of transitions 602 is written into track 7.

The next track 603 to be written is track 8. The head is displaced such that read element 301 is directly over the center of boundary 303 between servo tracks 6 and 7 (not shown). Write element 302, due to the one-and-a-half-track offset 305 between the head 118 elements (301, 302), is now aligned (not shown) over the center 304 of servo track 8. Write element 302 is activated and a set of transitions 601 is written into track 8.

The next track to be written is track 9. The head 118 is displaced such that read element 301 is directly over the center of boundary 303 between servo track 7 and 8. Write element 302, due to the one-and-a-half-track offset 305 between the head 118 elements (301, 302), is now aligned over the center 304 of servo track 9. The process continues writing alternating transitions (602, 601) until a desired number N of tracks are written on surface of disc 108. In the depicted position, note that the heads 301,302 are exactly aligned along the same radius 309. The radial offset will in fact be less than 1.5 track pitches in width at other positions, but an estimate of 1.5 track pitches is accurate enough for use within a zone of about 100 to 1000 tracks.

The servo system obtains positioning information from the propagated pattern after read element 301 reaches the end of the guide pattern 701. Furthermore, ZAP correction factors 402 can be added to each servo track 603 after write element 302 completes writing a servo burst transition 601, 602. The ZAP correction factors 402 eliminate written in errors and improve the track following capabilities of read element 301.

In a preferred embodiment of the present invention, the read element 301 is initially positioned in the guide pattern 701 so that a "gap" in the servo tracks 603 is not created. In other words if the read element 301 is offset from the write element 302 by three tracks, the furthest radial position that the servo positioner would place the read element 301 within guide pattern 701 would be in track 4. The write element 302 is aligned to write track 7 where there exists a three-track offset and the read element 301 is placed in track 4. As the servo propagation continues and read element 301 exits the guide pattern 701 (i.e., leaves track 6), it will move to the self-propagated servo tracks (here, servo track 7) because a gap in the servo tracks 603 does not exist.

Figure 8:
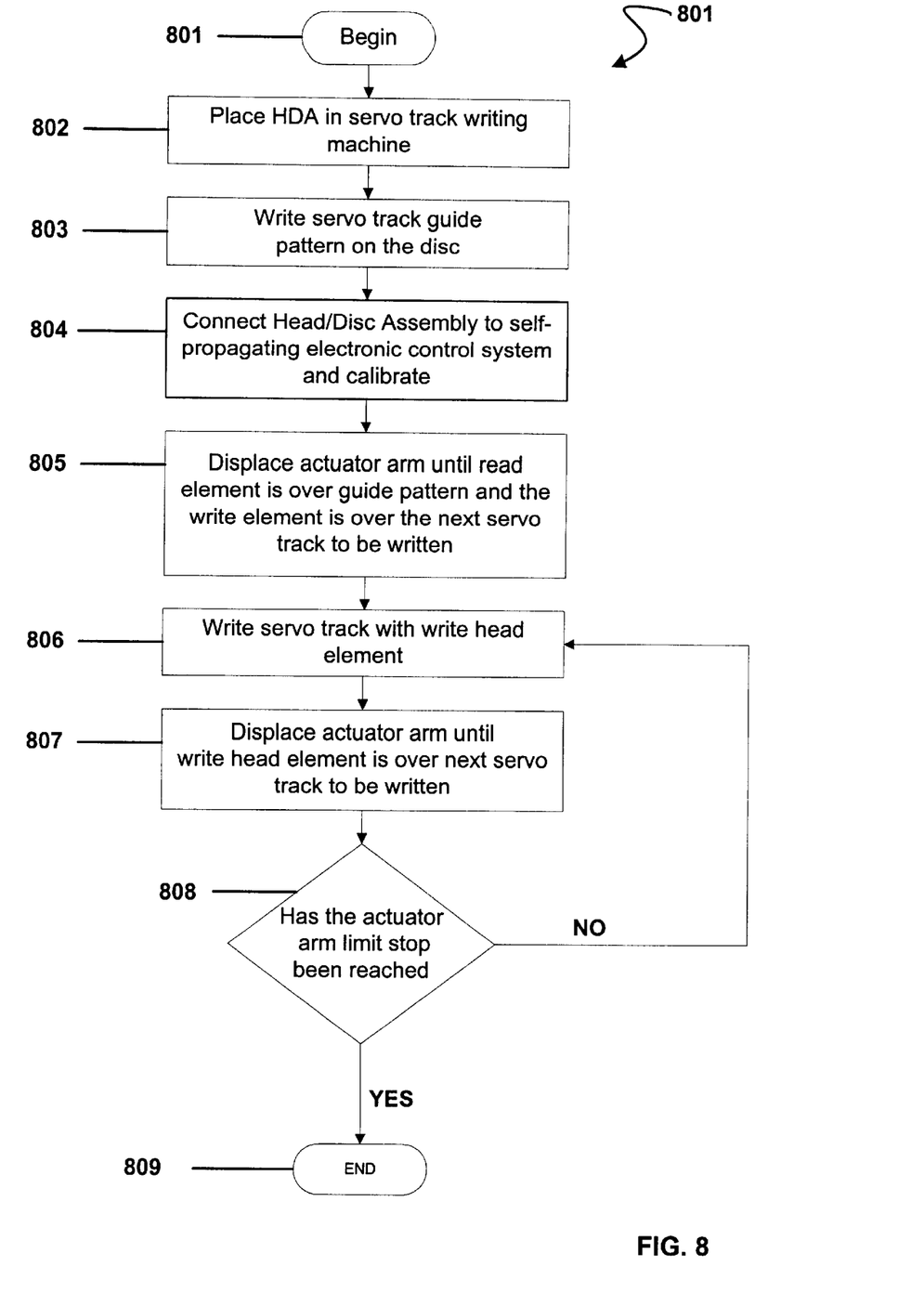
FIG. 8 is an operational flow diagram in accordance with a preferred embodiment of the present invention.

FIG. 8 illustrates servo-writing process 800 of a preferred embodiment of the present invention. Process 800 is initialized with begin operation 801. Control is passed to operation 802 and a head/disc assembly ("HDA") is place in a servowriting machine. Operation 803 assumes control from operation 802 once the HDA is placed in the servowriting machine. Operation 803 writes a servo track guide pattern 701 on the disc 108. A guide pattern 701 can be located at any radially location on the disc 108 surface. A guide pattern 701 is preferably written at the disc's 108 inner diameter for an offset head 118 arrangement wherein the read element 301 is nearer than the write element 302 to the inner diameter relative to the disc 108 surface. Conversely, a guide pattern 701 is preferably written at the disc's 108 outer diameter for an offset head 118 arrangement wherein the read element 301 is nearer than the write element 302 to the outer diameter relative to the disc 108 surface. Furthermore, several guide patterns 701, located at varying radial distances, may be placed on the surface of the disc 108. The present embodiment assumes that the read element 301 is nearer than the write element 302 to the inner diameter of the disc 108 and a single guide pattern 701 is written at the disc's 108 inner diameter.

Control is passed to operation 804 when operation 803 is completed. The HDA is connected to the self-propagating electronic control system and various calibrations are performed using the guide pattern 701 in operation 804. The calibrations completed by operation 804 include determining read element 301 width, write element 302 width, reader/writer offset 305, and position signal linearity among others. The control system can complete calibrations as the read/write transducer 118 traverses the surface of disc 108 in order to take into account the change in virtual offset. The control system is also capable of reading information (such as the guide pattern 701 among others) from the disc 108, determining the position of the read/write head 118 relative to the disc 108 surface, moving the HDA's actuator assembly 110 to align the read and write elements (301, 302) with a desired position on the disc 108, and writing information (such as servo burst information (601, 602 among others) to the disc 108.

Operation 805 assumes control once the HSA is connected to the control system in operation 804. Operation 805 activates the read element 301 and displaces the actuator assembly 110 until the read element 301 is flying over the guide pattern 701 written by operation 803. Operation 805 also uses the control system (using the guide pattern servo bursts 601, 602 and position error feedback signals among others) to determine the exact position of the read element 301 relative to the disc 108. Operation 805 uses the control system to adjust the position of the actuator assembly 110 so that the write element 302 is over the next track to be written.

The write element 302 position is determined by subtracting the calculated offset 305 from the desired track 603 to be written and aligning the read element 301 over the result. For example, assume that guide pattern 701 consists of 50 tracks and the calculated reader/writer offset 305 equals five-and-a-half tracks. The next track 603 that is to be written is track 51 if the guide pattern 701 consists of 50 tracks 603. The read element 301, therefore, is positioned between track 45 and track 46 (i.e., 51 minus 5 ½) in order to line the write element 302 over the center of track 51.

Operation 806 assumes control once Operation 805 has positioned the read element 301 over the desired guide pattern 701 location. Operation 806 enables the write element 302 and writes information to a servo track 603. The information includes sets of servo burst 601, 602 information that is used by the read element 301 as the servo tracks 603 are propagated. Operational control is then passed to operation 807.

Operation 807 displaces the actuator assembly 110 towards the disc's 108 outer diameter. Operation 807 uses the control system (using the guide pattern servo bursts 601, 602 and position error feedback signals among others) to determine the exact position of the read element 301 relative to the disc 108. Operation 807 uses the control system to adjust the position of the read element 301 so that write element 302 is located at the next servo track 603 to be written.

Determination operation 808 assumes control once operation 807 is complete. If the actuator assembly 110 did not reach its outer diameter limit stop, determination operation 808 branches NO and control is surrendered to Operation 806, which enables the write element 302 and writes information to the next servo track 603. If the actuator assembly 110 did reach its outer diameter limit stop, determination step 808 branches YES and end operation 809 terminates servo-writing process 800. Operation 808 can be alternatively implemented in many ways to determine whether a desired number of tracks have been written to the disc (such as comparing the number of tracks written to a predetermined track number and comparing the actual track density to a desired track density among others).

Figure 9:
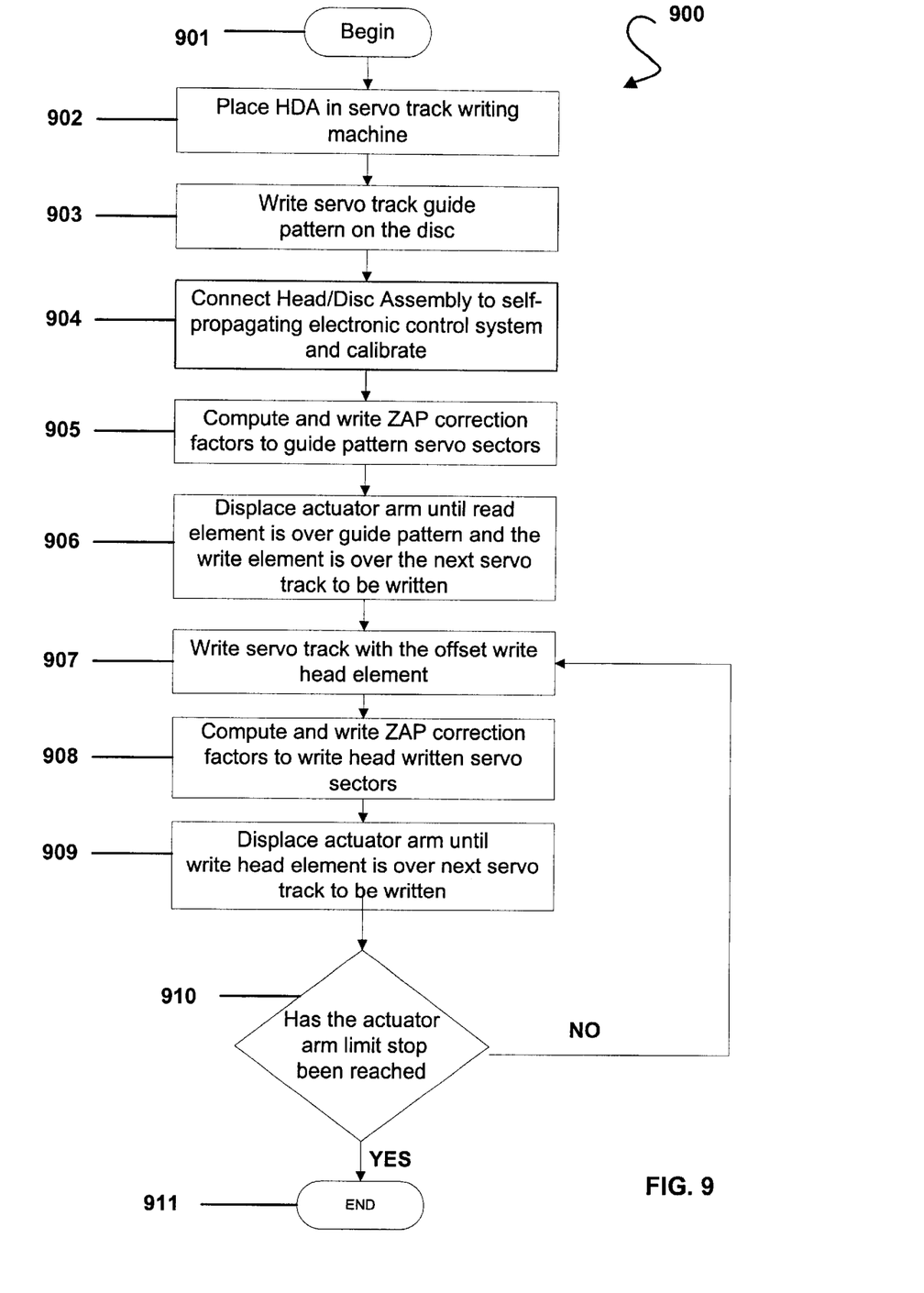
FIG. 9 is an operational flow diagram in accordance with a preferred embodiment of the present invention.

FIG. 9 illustrates servo-writing process 900 of a preferred embodiment of the present invention. Process 900 is initialized with begin operation 901. Control is passed to operation 902 and a head/disc assembly ("HDA") is placed in a servowriting machine.

Operation 903 assumes control from operation 902 once the HDA is placed in the servowriting machine. Operation 903 writes a servo track guide pattern 701 on the disc 108. A guide pattern 701 can be located at any radially location on the disc 108 surface. A guide pattern 701 is preferably written at the disc's 108 inner diameter for an offset head 118 arrangement wherein the read element 301 is nearer than the write element 302 to the inner diameter relative to the disc 108 surface. Conversely, a guide pattern 701 is preferably written at the disc's 108 outer diameter for an offset head 118 arrangement wherein the read element 301 is nearer than the write element 302 to the outer diameter relative to the disc 108 surface. Furthermore, a multitude of guide patterns 701, located at varying radial distances, may be placed on the surface of the disc 108. The present embodiment assumes that the read element 301 is nearer than the write element 302 to the inner diameter of the disc 108 and a single guide pattern 701 is written on the disc's 108 inner diameter.

Control is passed to operation 904 when operation 903 is completed. The HDA is connected to the self-propagating electronic control system and various calibrations are performed using the guide pattern 701 in operation 904. The calibrations completed by operation 904 include determining read element 301 width, write element 302 width, reader/writer offset 305, and position signal linearity, among others. Control is passed to operation 905 when operation 904 is completed.

Operation 905 uses the write element 302 to compute and write zero acceleration path ("ZAP") correction factors 402 into the guide pattern servo tracks 701 written by operation 903. The ZAP correction factors 402 are added to the measured head 118 position at each servo sector and cancel all written in errors. The shape of the resulting modified track 401 will be nearly perfectly circular after the correction factors 402 are added. Any subsequent servo track 603 that is written to the disc 108 that follows modified track 401 will also be nearly perfectly circular and not contain the deformation errors found in the non-ZAP corrected servo track 403. The correction factors 402 can be stored in a dedicated field in each servo sector. The ZAP correction factors 402 can also be used during the normal disc drive 100 operation to cancel any repeatable disturbances, such as track shape irregularity among others.

Operation 906 assumes control once operation 905 is complete. Operation 906 activates the read element 301 and displaces the actuator assembly 110 until read element 301 is flying over the guide pattern 701 and the write element 302 (offset from the read element 301) is flying over the next track 603 to be written. Operation 906 uses the control system (using the guide pattern 701 servo bursts 601, 602 and position error feedback signals among others) to determine the exact position of the read element 301 relative to the disc 108. Operation 906 uses the control system to adjust the position of the read element 301 so that the write element 302 is located at the next track 603 to be written.

The read element 302 position is determined by subtracting the calculated offset 305 from the desired track 603 to be written and aligning the read element 301 over the result. For example, assume that guide pattern 701 consists of 50 tracks and the calculated reader/writer offset 305 equals five-and-a-half tracks. The next track 603 that is to be written is track 51 if the guide pattern 701 consists of 50 tracks 603. The read element 301, therefore, is positioned between track 45 and track 46 (i.e., 51 minus 5 ½) in order to line the write element 302 over the center of track 51.

Operation 907 assumes control once Operation 906 has positioned the write element 302 over the next track 603 to be written. Operation 907 enables the write element 302 and writes information to a servo track 603. The information includes sets of servo burst 601, 602 information that is used by the read element 301 as the servo tracks 603 are propagated. This operation may also write Grey code information that is used to determine the coarse position of the read element 301. Operational control is then passed to operation 908.

Operation 908 computes the ZAP correction factors 402 for the track 603 written in operation 907, and uses the write element 302 to insert zero acceleration path ("ZAP") correction factors 402 into the servo tracks 603. The ZAP correction factors 402 are added to the measured head 118 position at each servo sector and cancel all written in errors. The shape of the resulting modified track 401 will be nearly perfectly circular after the correction factors 402 are added. Any subsequent servo track 603 that is written to the disc 108 that follows modified track 401 will not inherit deformation errors found in the non-ZAP corrected servo track 403. The correction factors 402 can be stored in a dedicated field in each servo sector. The ZAP correction factors 402 can also be used during the normal disc drive 100 operation to cancel any repeatable disturbances, such as track shape irregularity among others.

Operation 909 displaces the actuator assembly 110 towards the disc's 108 outer diameter. Operation 909 uses the control system (using the guide pattern 701 servo bursts 601, 602 and position error feedback signals among others) to determine the exact position of the read element 301 relative to the disc 108. Operation 909 uses the control system to adjust the position of the read element 301 so that the write element 302 is located at the next track 603 center to be written.

Determination step 910 assumes control once operation 909 is complete. If the actuator assembly 110 did not reach its outer diameter limit stop, determination step 910 branches NO and control is surrendered to Operation 907, which enables the write element 302 and writes information to the next servo track 603. If the actuator assembly 110 did reach its outer diameter limit stop, determination step 910 branches YES and end operation 911 terminates servo-writing process 900. Operation 910 can be alternatively implemented in many ways to determine whether a desired number of tracks have been written to the disc (such as comparing the number of tracks written to a predetermined track number and comparing the actual track density to a desired track density among others).

Figure 10:
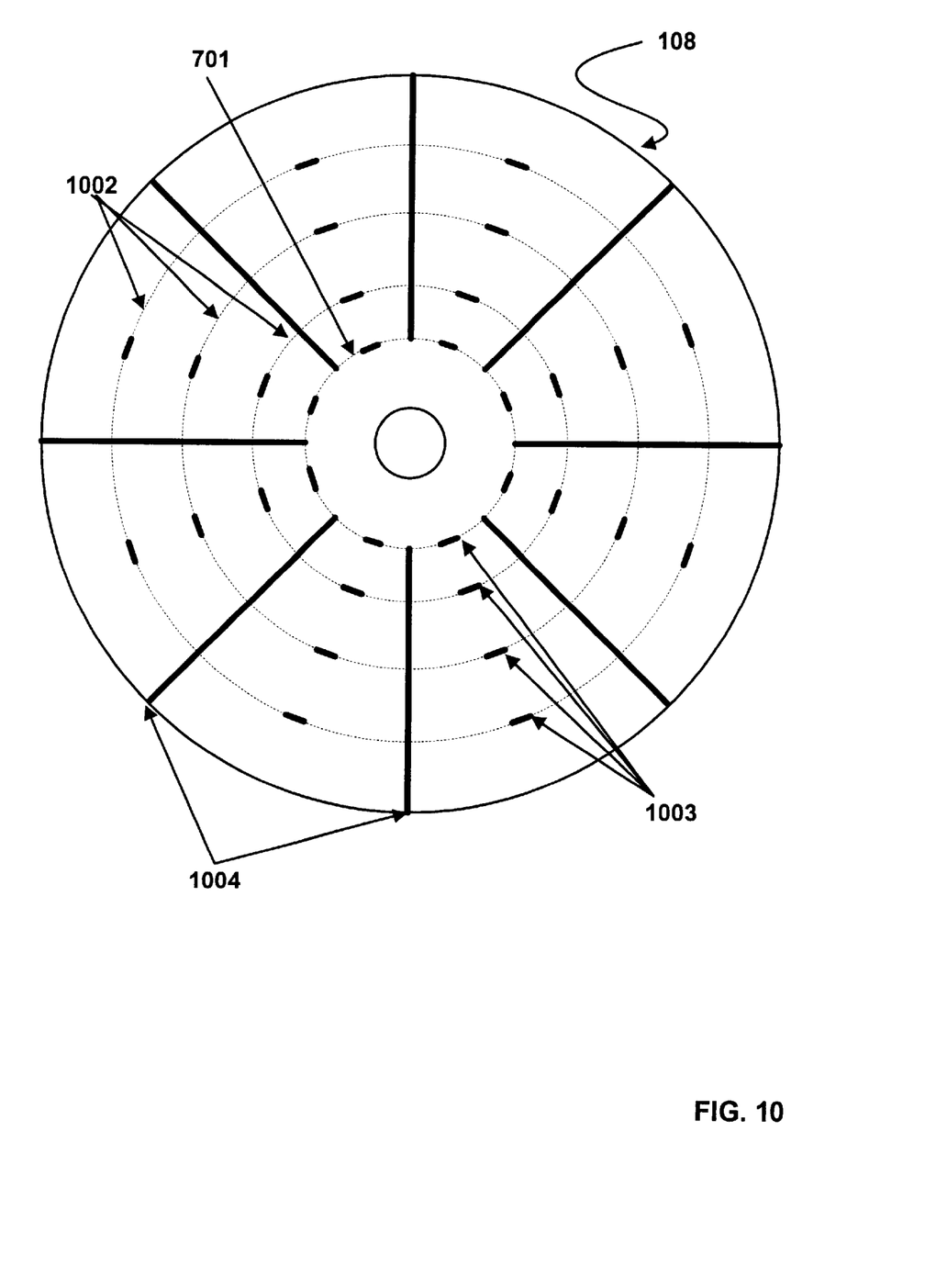
FIG. 10 is an embodiment of the present invention in which multiple guide zones are written on the disc surface.

It will be clear that the present invention is well adapted to attain the ends and advantages mentioned as well as those inherent therein. While a presently preferred embodiment has been described for purposes of this disclosure, various changes and modifications may be made which are well within the scope of the present invention. FIG. 10, for example, illustrates a preferred embodiment in which multiple guide zones 1002 located at various radial distances on the disc 108 surface accompany initial guide zone 701, located at the inner diameter of disc 108. As previously mentioned, servo track information is written to guide zone servo sectors 1003 angularly disbursed around the diameter of the various guide zones 701, 1002. The guide zones 701, 1002 can be spaced such that accumulated track spacing errors will remain within a desired tolerance as the servo pattern is propagated from one guide zone to the next. The track spacing error can be determined by comparing the spacing of the propagated pattern and that of the guide pattern when the head 118 reaches the next guide zone. Thus, an appropriate correction factor could be introduced during the propagation towards the subsequent guide zone.

In another preferred embodiment, the read element 301 begins by following initial guide zone 701. The write element 302, offset towards the outer diameter of disc 108, is used to write servo tracks 1004 on disc 108. Servo tracks 1004 are angularly displaced from the guide zone servo tracks 1003 so as to prevent guide zone servo tracks 1003 from being erased. The angular offset between servo tracks 1004 and guide zone servo tracks 1003 is helpful because the write element 302 precedes the read element 301 as the servo tracks 1004 are propagated. The read element 301, upon reaching the next guide zone 1002, is able to read the guide zone servo sectors 1003. Corrections for track spacing errors, virtual offset calibrations and other adjustments can be made each time that the read element 301 reaches a subsequent guide zone 1002. The angular offset between the propagated servo tracks 1004 and the guide zone servo tracks 1003 can be accomplished by adjusting the clock-timing signal.

In another embodiment, the relative positions of the read and write elements 301, 302 to the disc 108 surface can be reversed. The read element 301 can be placed such that it is nearer the outer diameter of the disc 108 surface and the write element 302 can be placed such that it is nearer to the inner diameter of the disc 108 surface. In this embodiment, the servo writing process begins at a guide zone 701 located at the outer diameter of the disc 108 and proceeds towards the inner diameter of the disc 108; the write element 302 preceding the read element 301.

In yet another embodiment of the present invention, the guide patterns 701 can be written onto the discs 108 before they are assembled into the drive 100 by optical, mechanical, chemical, electrostatic, or magnetic means if the accuracy of the servowriting machine is inadequate. For example, a simple solution is to write the guide patterns 701 on an air bearing spin stand.

In summary, the present invention may be viewed as a method (such as shown in operational flow process 800) of writing servo tracks (such as 603) on a disc drive (such as 100), the disc drive (such as 100) having a data storage disc (such as 108) having a center (such as 109), an actuator arm (such as 110) that traverses a surface of the data storage disc (such as 108), a read/write head (such as 118) attached to the actuator arm (such as 110), the read/write (such as 118) head having a read element (such as 301) and a write element (such as 302). The read element (such as 301) and the write element (such as 302) are offset (such as 305) from each other relative to the center (such as 109) of the data storage disc (such as 108).

The method (such as operational flow process 800) includes: writing a servo track guide pattern (such as 701) having a servo track (such as 603) therein on the data storage disc (such as 108); determining the offset (such as 305) between the read element (such as 301) and the write element (such as 302); determining a location within the guide pattern (such as 701) that corresponds to a position of a self-propagated servo track (such as 603) to be written minus the offset (such as 305); displacing the actuator arm (such as 114) until the read element (such as 301) is aligned over the location in the guide pattern (such as 701) that corresponds to the position of the self-propagated servo track (such as 603) to be written minus the offset (such as 305); writing the self-propagated servo track (such as 603) with the write element (such as 302) while the read element (such as 301) obtains position information from the location within the guide pattern (such as 701); and repeating these steps for a next self-propagated servo track (such as 603) to be written until the read element (such as 301) exits the guide pattern (such as 701) and obtains positioning information from the self-propagated servo tracks (such as 603) written by the write element (such as 302).

The method (such as operational flow process 800) can also further be viewed as having the following steps: determining a location within the previous written self-propagated servo tracks (such as 603) that corresponds to the position of the self-propagating servo track (such as 603) to be written minus the offset (such as 305); displacing the actuator arm (such as 114) until the read element (such as 301) is aligned over the location in the previous written self-propagated servo tracks (such as 603) that corresponds to the position of the self-propagated servo track (such as 603) to be written minus the offset (such as 305), writing the self-propagated servo track (such as 603) with the write element (such as 302) while the read element (such as 301) obtains position information from the location within the previously written self-propagated servo tracks (such as 603).

The method (such as operational flow process 800) can also be viewed as continuing self-propagation servo track writing using previously written self-propagated servo tracks (such as 603) until a predetermined number of self-propagated servo tracks (such as 603) are written to the data storage disc (such as 108). The offset (such as 305) can be recalculated after a predetermined number of self-propagated tracks (such as 603) are written. Recalculation accounts for the change in virtual offset by to redefining the offset (such as 305) between the read element (such as 301) and the write element (such as 302) as the actuator arm (such as 114) traverses over the surface of the storage disc (such as 108).

Additionally, the method (such as operational flow process 800) can be viewed as further comprising writing additional servo track guide patterns (such as 1002) on the data storage disc (such as 108), the servo track guide patterns (such as 1002) being located at different radial distances from the center (such as 109) of the disc (such as 108), each servo track guide pattern (such as 1002) having a servo sector written therein angularly spaced around the circumference of the servo track (such as 1003) within the servo track guide pattern (such as 1002). Furthermore, the method can be viewed as comprising writing a servo sector within each self-propagated servo track (such as 1004) at a location angularly displaced from a servo sector written within the servo track (such as 1003) within the servo track guide pattern (such as 1002).

The method (such as operational flow process 800) can further be viewed as including writing a servo sector within the self-propagated servo track (such as 603) at a location angularly displaced from a servo sector within the servo track (such as 603) within the servo track guide pattern (such as 701). The method (such as operational flow process 800) can be implemented wherein writing a plurality of servo track guide patterns (such as 701) are written on the data storage disc (such as 108), each of the servo track guide patterns (such as 701) being located at a different radial distance from the center of the disc (such as 109), each servo track guide pattern (such as 701) having a servo sector written therein angularly spaced around the circumference of the servo track (such as 603) within the servo track guide pattern (such as 701).

Additionally, The method (such as operational flow process 800) can be viewed as including writing a servo sector within another self-propagated servo track (such as 603) at a location angularly displaced from a servo sector written within the servo track (such as 603) within the servo track guide pattern (such as 701). Furthermore the method (such as operational flow process 800) can be implemented with writing ZAP correction (such as 402) factors within the servo track (such as 603) within the guide pattern (such as 701). ZAP correction factors (such as 402) can also be written within the self-propagated servo track (such as 603) written by the write element (such as 302). The method (such as operational flow process 800) can be implemented without having previously erased the data storage disc (such as 108).

The present invention may further be viewed as an apparatus for writing servo tracks (such as 603) on a disc drive (such as 100). The disc drive (such as 100) can be viewed as having a data storage disc (such as 108) having a center (such as 109), an actuator arm (such as 110) that traverses the surface of the data storage disc (such as 108), and a read/write head (such as 118) attached to the actuator arm (such as 110). The read/write head (such as 118) can be viewed as having a read element (such as 301) and a write element (such as 302); the read element (such as 301) and the write element (such as 302) are offset (such as 305) from each other relative to the center (such as 109) of the data storage disc (such as 108).

The apparatus can also be viewed as having a controller capable of sequentially: displacing the actuator arm (such as 110) until the read element (such as 301) is aligned to obtain position information from a servo track guide pattern (such as 701); determining the offset (such as 305) between the read element (such as 301) and the write element (such as 302); adjusting the alignment of the read element (such as 301) to follow a location within the servo track guide pattern (such as 701) that corresponds to a position of a self-propagated servo track (such as 603) to be written minus the offset (such as 305); writing a self-propagated servo track (such as 603) on the data storage disc (such as 108) using the write element (such as 302); displacing the actuator arm (such as 110) in the direction of the write element (such as 302) until the read element (such as 301) is aligned to obtain information from the self-propagated servo track (such as 603) written by the write element (such as 302); adjust the alignment of the read element (such as 301) to follow a location within the previously written self-propagated servo tracks (such as 603) that corresponds to the position of the self-propagated servo track (such as 603) to be written minus that offset (such as 305); and write the self-propagated servo track (such as 603) on the storage disc (such as 108) using the write element (such as 302).

The controller can also write a ZAP correction factor (such as 402) into the servo track (such as 603) in the servo track guide pattern (such as 701) or into each self-propagated servo track (such as 603) written by the write element (such as 302). The apparatus can further be viewed as having a servowriting machine to write the servo track guide pattern (such as 701) on the data storage disc (such as 108). The read element (such as 301) of the apparatus can be viewed as being offset from the write element (such as 302) by a distance (such as 305) great enough to prevent a zero virtual offset from occurring as the actuator arm (such as 110) traverses the surface of the data storage disc (such as 108). The read element (such as 301) of the apparatus can also be viewed as being offset from the write element (such as 302) by at least the width of one servo track (such as 603). Finally, the data storage disc (such as 108) can be a magnetic media disc.

Numerous other changes may be made which will readily suggest themselves to those skilled in the art and which are encompassed in the spirit of the invention disclosed and as defined in the appended claims.

What is claimed is:

1. A method of writing servo tracks in a disc drive, the disc drive having a data storage disc having a center, an actuator arm that traverses a surface of the data storage disc, a read/write head having a read element and a write element supported by the actuator arm, the read and write elements having a radial offset from each other relative to the center of the data storage disc, the method comprising acts of:

(a) writing a first servo track guide pattern on the storage disc, the guide pattern including a first servo track;

(b) receiving several position samples from the read element while the read element is at least partially over the first servo track; and (c) writing a second servo track while positioning the write element with a signal derived from the position samples and an estimate of the radial offset.

2. The method of claim 1 in which writing act (a) includes an act (a1) of using a servowriting machine to write at least (R/P−1) additional servo tracks adjacent to the first servo track, where R is the estimate of the radial offset and P is an average track pitch estimate.

3. The method of claim 1 in which writing act (c) includes an act (c1) of updating the estimate of the radial offset if a positional change larger than a predetermined threshold has occurred since a prior act of updating, and otherwise generally not updating the estimate of the radial offset.

4. The method of claim 1 in which writing act (c) further comprises subsequently writing a positional correction value within the second servo track.

5. The method of claim 1 in which the writing act (a) is performed without having previously erased the data storage disc.

6. The method of claim 1 in which writing act (c) is performed while the second servo track is no closer to the read element than to the first servo track.

7. The method of claim 1, further comprising an act (d) of writing a second servo track guide pattern on the storage disc in an angular position with respect to the disc so as to prevent the second servo track guide pattern from being erased during a subsequent act of self-servo writing.

8. An apparatus for writing servo data Comprising;

a data storage disc having a surface having a center and a series of annular tracks having an average pitch P;

an actuator arm configured to traverse the surface within a fixed movement range;

a read/write head supported by the actuator arm and having a read element and a write element, the read and write elements having a relative radial offset that is larger than P throughout the movement range of the actuator arm; and a controller configured to write the servo data while positioning the write element using data received from the read element.

9. The apparatus of claim 8 further comprising a servowriting machine configured to write a servo track guide pattern on the data storage disc.

10. The apparatus of claim 9 in which the offset is large enough so that the read and write elements have no radial overlap throughout the movement range of the actuator arm.

11. An apparatus for writing servo data comprising:

a read/write head having a write element radially offset from a read element by at least one servo track width relative to a disc surface; and means for aligning the read element over a previously written servo track and following a previously written servo track while a new servo track is written with the offset write element.

* * * * *